Figure 1:
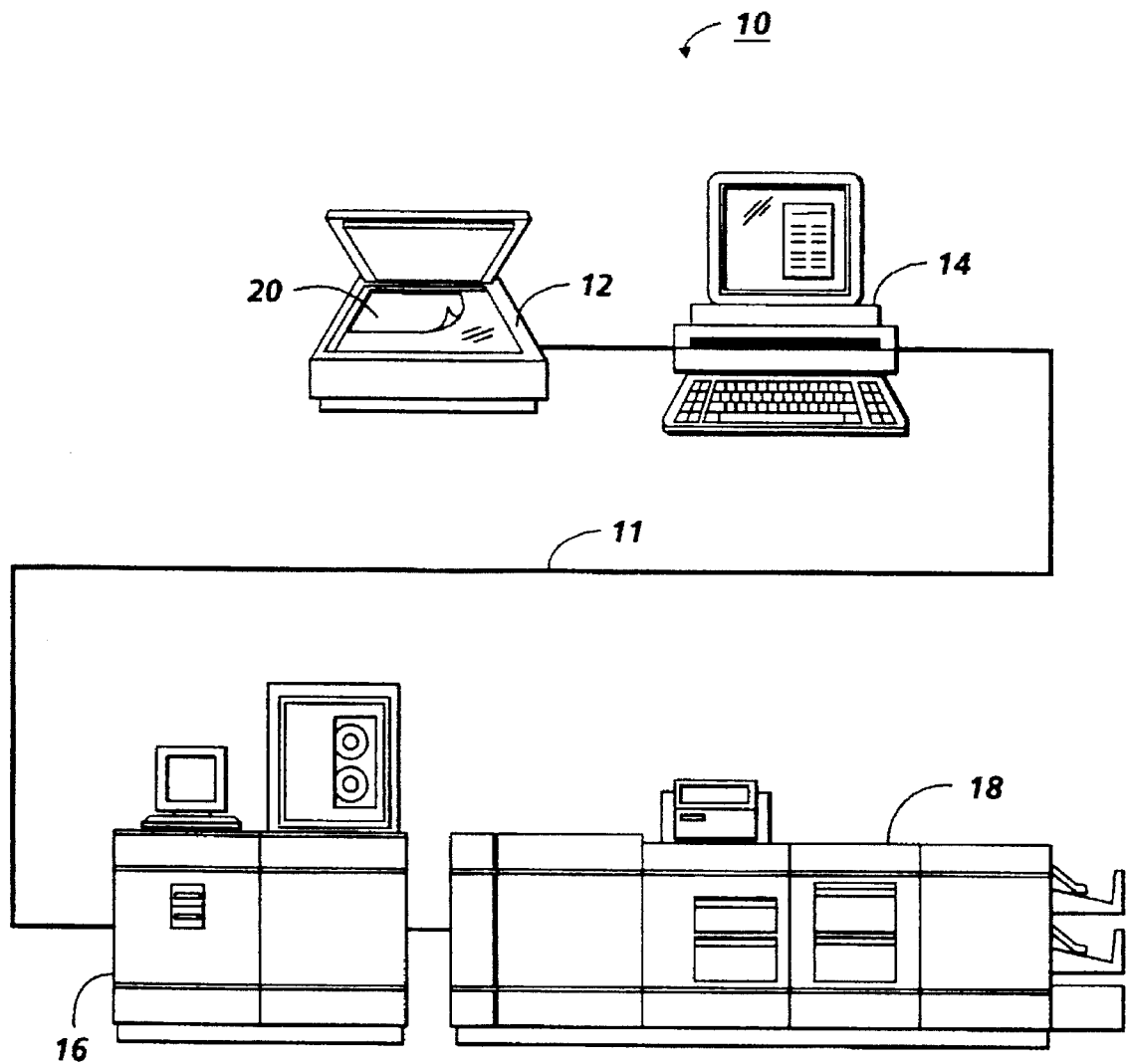

United States Patent [19]
Goldsmith

[11] Patent Number: 5,649,024
[45] Date of Patent: Jul. 15, 1997

[54] METHOD FOR COLOR HIGHLIGHTING OF BLACK AND WHITE FONTS

[75] Inventor: Alan Goldsmith, Fairport, N.Y.

[73] Assignee: Xerox Corporation, Stamford, Conn.

[21] Appl. No.: 340,942

[22] Filed: Nov. 17, 1994

[51] Int. Cl.⁶ .................................................. G06K 9/00
[52] U.S. Cl. .................. 382/170; 395/110; 382/176; 382/190; 358/537
[58] Field of Search .................. 395/150, 151, 395/110; 382/170, 176, 181, 190; 358/537

[56] References Cited

U.S. PATENT DOCUMENTS

| | | | |
|---|---|---|---|
| 4,308,553 | 12/1981 | Roetling | 358/75 |
| 4,857,955 | 8/1989 | Crandall | 395/109 |
| 5,048,113 | 9/1991 | Yamagata et al. | 382/57 |
| 5,105,266 | 4/1992 | Telle | 358/80 |
| 5,113,356 | 5/1992 | Nickell et al. | 395/108 |
| 5,153,576 | 10/1992 | Harrington | 340/793 |
| 5,159,645 | 10/1992 | Kumagai | 382/22 |
| 5,167,013 | 11/1992 | Hube et al. | 395/110 |
| 5,206,687 | 4/1993 | Suzuki et al. | 399/74 |
| 5,245,674 | 9/1993 | Cass et al. | 382/16 |
| 5,253,307 | 10/1993 | Wayner et al. | 382/22 |
| 5,278,920 | 1/1994 | Bernzott et al. | 382/9 |
| 5,291,243 | 3/1994 | Heckman et al. | 355/201 |
| 5,311,336 | 5/1994 | Kurita et al. | 358/453 |
| 5,359,673 | 10/1994 | de la Beaujardiere | 382/40 |
| 5,369,715 | 11/1994 | Tanaka et al. | 382/18 |
| 5,493,386 | 2/1996 | Thompson | 355/210 |
| 5,513,277 | 4/1996 | Huttenlocher | 382/171 |

*Primary Examiner*—Peter S. Wong
*Assistant Examiner*—Derek J. Jardieu

[57] ABSTRACT

Printing reproductions of a black and white only original document on a digital printer capable of color printing, with selected black and white text portions of the original being printed in a highlight color, wherein the original document uses at least two different black and white text fonts, by forming as by scanning an electronic image of the black and white only original document; selecting at least one font; automatically electronically searching the text of the electronic image to find and electronically designate occurrences of the same selected font to be reproduced in a highlight color by electronically providing a color printing control associated therewith; and printing the electronic image with the digital printer automatically controlled by the color printing control so that the occurrences of the selected font are printed in a highlight color by automatically replacing the black and white original text in the selected font with the highlight color, but with the other text in other fonts printed in black and white, to provide reproductions with automatic color highlighting of only the selected font, without requiring manual designations of coordinate locations therefor, wherever it occurs in the original document.

4 Claims, 2 Drawing Sheets

METHOD FOR COLOR HIGHLIGHTING OF BLACK AND WHITE FONTS

Disclosed is a system and method for generating "highlight color" enhanced copies from a black only (black and white) original document, wherein copies of the black only document may be reproduced on a color digital printer with selected font texts printed in a highlight color replacing the black in the original font lettering. It is especially effective for automatic coloring of the interior of special large area large fonts. This disclosed system may be compatibly utilized with various conventional or existing document scanners, image processors, page description languages and other software, and networked or stand alone printers.

With the disclosed system, selected fonts may be printed in color, to stand out, while the rest of the document, that is, all of it printed in other fonts, may still be printed in its original black and white. This may be easily done even by a casual operator. It does not require an operator to carefully define, on precisely located x and y axes, each and every area of the document to be highlight colored, as in many other highlight color reproduction systems.

As disclosed in the examples herein, the image processing software, in PDL (page description language) decomposer or the printing controller or other suitable preprinting system or step, may be variably operator pre-programmed to recognize one or more particular fonts used in the black and white document, and, upon such recognition, to automatically generate color printing instructions associated with those recognized fonts so that they will print in color (on a color printer) separately from the rest of the document. That is, the selected fonts only may be printed in color, to stand out, while the rest of the document, printed in other fonts, may still be printed in its original black and white.

By way of general background as to fonts in electronic printing and font substitutions, there is noted Xerox Corporation U.S. Pat. No. 5,167,013 issued Nov. 24, 1992 to R. Hube, et al.

Of particular background interest as to digital color printing of fonts with variable image background patterns of intermixed printed and non-printed dots or areas, using a tri-level xerographic printer, or color ink jet printer, or other known highlight color digital printer, is Xerox Corporation U.S. Pat. No. 5,291,243 issued Mar. 1, 1994 to Heckman, et al., and other art noted therein.

Said U.S. Pat. No. 5,291,243 also cites and describes patents such as U.S. Pat. Nos. 5,091,966, 5,128,525, 5,168,147, and products, on "glyphs" (an embedded digitally readable font, such as a very small and fine pattern of "//ΛVN" printed on hardcopy documents), as usable for color coding. Additional publications, such as the Jun. 19, 1994 "Dallas Morning News", interviewing David Hecht of the Xerox Parc laboratories, suggest various glyph uses including "embedded color coding". (As understood, with the latter a color original can be copied in black and white, and then the colors can be restored to the original colors automatically in a subsequent color copy from electronically reading the glyph codes in even a damaged second generation copy of the black and white copy.) However, it will be appreciated that this is only possible where the original was so specially glyph encoded, and no normal pre-existing documents are. Also it requires special glyph printing and reading systems.

Said U.S. Pat. No. 5,291,243 notes that a highlight color printer and its imaging controls that can provide "perfect registration" is the Xerox Corporation "4850" (or 4890) "Highlight Color Laser Printing System" product, commercially available since September 1991. The "4850" has single-pass two color "perfect registration", with the ability to print an integral image of interdigitated pixels of the two colors. That printer has a tri-level xerographic system, as further explained, inter alia, in Xerox Corporation U.S. Pat. Nos. 5,144,369; 4,811,046; and 4,847,655; and additionally in U.S. Pat. Nos. 5,157,441; 5,138,378; 5,119,131; and 5,132,730. Particularly noted re providing interdigitated color pixels of alternating colors and varying white or unprinted spaces (difficult to produce on other copiers or printers) is Xerox Corporation U.S. Pat. No. 4,903,048, issued Feb. 20, 1990 to S. J. Harrington.

However, said U.S. Pat. No. 5,291,243 also notes that other electronic printers and/or image generation and/or transfer devices and/or marking materials may be alternatively utilizable if they can provide comparable printing requirements. For example, a two-color, single-head, ink jet printing head is disclosed in Xerox Corporation U.S. Pat. Nos. 4,620,198 and 4,899,181.

Said U.S. Pat. No. 5,291,243 further notes by way of background, that known electronic printing standards includes a specific set of instructions for printing, in a standard for representing documents digitally. The "Interpress™" standard for representing printed pages, for example, is already supported by a wide range of Xerox Corporation and other products. The print service understands and processes "Interpress™" or other PDL instructions received from a workstation, transforming them into a format understood by the printer. The "Interpress™" standard is comprehensive; it can represent any images that can be applied to paper (including complex graphics) and a wide variety of font styles and characters. This allows a user to easily produce new masters and allows the printer to selectively print pages from any master it receives. The "Interpress™" master is also accompanied by properties and options which specify document name, color, and creation date. The print service interprets the master and then directs the printer during the printing process. Workstations on the network can interact with the print service. This software runs automatically when users request that a document be printed. It converts the document format used by the workstation into an "Interpress™" master which is transmitted to the print service. Utilizing an inter-network routing service, users can transmit "Interpress™" or other printing masters through a network and then across an internet, typically, via telephone lines, twisted pair wires, coaxial cables, microwaves, infrared, and/or other data links.

Said U.S. Pat. No. 5,291,243 further notes that an image generation system can be provided by using a personal computer, with available software. For example, an IBM PC AT or the like, having a mouse and a color VGA monitor and operating CorelDRAW Version 3.0 graphics design software, Corel Corporation, 1992, and Elixir forms-creation software, a description of which is found in the Xerox Printing Productivity Series: Elixir Edition for Highlight Color, User Guide for ElixiForm/ElixiSys Version 2.10; ElixiGraphics Version 2.10a; and ElixiFont Version 1.0 publication numbers 720P60700, 720P60691 and 720P82890, by Xerox Corporation, dated August 1991, March 1992 and June 1989, respectively. Elixir is an interactive software design tool that enable a user to create forms, custom fonts and the like for use with a highlight color printer. Forms include elements such as lines, boxes, text and images, all of which can have highlight color attributes. The static data can subsequently be merged with variable data for printing on color-compatible printers using a known Forms Source Language (FSL).

Also noted regarding commercially available software for color designation or representation of document areas is the well known "Postscript II" product.

Further noted of interest are Xerox Corporation U.S. Pat. No. 4,308,553 issued Dec. 29, 1981 to Paul Roetling, "METHOD AND APPARATUS FOR MAKING MONOCHROME FACSIMILIES OF COLOR IMAGES ON COLOR DISPLAYS; and Xerox Corporation U.S. Pat. No. 5,153,576 issued Oct. 6, 1992 to Steven Harrington, "MAPPING OF COLOR IMAGES TO BACK-AND-WHITE TEXTURED IMAGES". As noted from these titles themselves, this is opposite from the present need and function. Some conventional PDL enabled printers can now also take color designated objects and print them in B&W.

Automatic font substitution is also known and used in commercial digital printers. However, that is typically used where an electronic document is sent to a printer with a PDL requirement for a particular font which has not been loaded into the printer or its spooler or server. So another font is automatically substituted in some cases before printing. E.g., Xerox Corporation U.S. Pat. No. 5,167,013 (D/90425).

By way of further background on printers with halftone image printing, and/or image or plural-bit pixel processing, there is additionally noted U.S. patent application Ser. No. 08/004479 by Shiau published as EP-A2 0 521 662 on Jan. 7, 1993; and U.S. Pat. Nos. 4,194,221 to Stoffel; U.S. Pat. No. 4,811,115 to Lin et al; U.S. Pat. No. 4,275,413 to Sakamoto; and U.S. Pat. No. 4,500,919 to Schreiber. U.S. Pat. No. 4,556,918 to Yamazaki et al shows an arrangement assuming a periodicity of an area of halftone dots which are thresholded against an average value derived from the area to produce a density related video signal; U.S. Pat. No. 4,251,837 to Janeway shows the use of a three decision mode selection for determining threshold selection based on gradient constants for each pixel; U.S. Pat. No. 4,559,563 to Joiner, Jr. suggests an adaptive prediction for compressing data based on a predictor which worked best for a previous pixel block; and U.S. Pat. No. 3,294,896 to Young, Jr. teaches the usefulness of thresholding in producing an image from a binary digital transmission system. U.S. Pat. No. 4,509,195 to Nadler describes a method for binarization of a pattern wherein two concentric rings around a pixel are evaluated to determine contrast values, and the contrast values are used then to determine whether the pixel and the surrounding areas have a light or dark quality. U.S. Pat. No. 4,547,811 to Ochi et al teaches a method of processing gray level values, depending on the density level of blocks of pixels, and their difference from a minimum or maximum value. The blocks are then processable by a halftone processing matrix depending on the difference value. U.S. Pat. No. 4,730,221 to Roetling discloses a screening technique where values of gray over an image are evaluated to determine a minimum and maximum level, in order to determine constant levels of gray. U.S. Pat. No. 4,736,253 to Shida discloses a method of producing a halftone dot by selectively comparing image signals with highlight and shadow reference values, for determination of the binarization process.

By way of background as to some examples of recent patents relating to digital printing with network environments of plural remote terminal shared users of networked printers, they include Xerox Corporation U.S. Pat. Nos. 5,243,518; 5,226,112; 5,170,340 and 5,287,194. Some patents on this subject by others include U.S. Pat. No. 5,113,355, 5,113,494 (originally filed Feb. 27, 1987), 5,181,162, 5,220,674, 5,247,670; 4,953,080 and 4,821,107. Further by way of background, some of the following Xerox Corporation U.S. Pat. Nos. also include examples of networked systems with printers: 5,153,577; 5,113,517; 5,072,412; 5,065,347; 5,008,853; 4,947,345; 4,939,507; 4,937,036; 4,920,481; 4,914,586; 4,899,136; 4,453,128; 4,063,220; 4,099,024; 3,958,088; 3,920,895; and 3,597,071. Also noted are IBM Corp. U.S. Pat. Nos. 4,651,278 and 4,623,244, and Canon U.S. Pat. No. 4,760,458 and Jap. Pub. No. 59-63872 published Nov. 4, 1984. Some of these patents also disclose multifunction machines (digital scanner/faximile/printer/copiers) and their controls.

Some other early digital network systems related publications include "Xerox Office Systems Technology" "..Xerox 8000 Series Products: Workstations, Services, Ethernet, and Software Deveolopment" ©1982, 1984 by Xerox Corporation, OSD-R8203A, Ed. T. Linden and E. Harslem, with a "Table of Contents" citing its numerous prior publications sources, and an Abstract noting the April 1981 announcement of "the 8110 Star Informations System, a new personal computer.."; "Xerox System Integration Standard Printing Protocol XSIS 118404", April 1984; "Xerox Integrated Production Publishers Solutions:. . ." Booklet No. "610P50807" "November 1985"; "Printing Protocol-Xerox System Integration Standard" ©1990 by Xerox Corporation, XNSS 119005 May 1990; "Xerox Network Systems Architecture", "General Information Manual", XNSG 068504 April 1985, with an extensive annotated bibliography, ©1985 by Xerox Corporation; "Interpress™: The Source Book", Simon & Schuster, Inc., New York, N.Y., 1988, by Harrington, S. J. and Buckley, R. R.; Adobe Systems Incorporated "PostScript® Language Reference Manual", Addison-Wesley Co., 1990; "Mastering Novell®Netware®", 1990, SYBEX, Inc., Alameda, Calif., by Cheryl E. Currid and Craig A. Gillett; "Palladium Print System" ©MIT 1984, et sec; "Athena85" "Computing in Higher Education: The Athena Experience", E. Balkovich, et al, Communications of the ACM, 28(11) pp. 1214–1224, November, 1985; and "Apollo87" "The Network Computing Architecture and System: An Environment for Developing Distributed Applications", T. H. Dineen, et al, Usenix Conference Proceedings, June 1987.

Also noted re commercial network systems with printers and software therefor is the 1992 Xerox Corporation "Network Publisher" version of the 1990 "DocuTech®" publishing system, including the "Network Server" to customer's Novell® 3.11 networks, supporting various different network protocols and "Ethernet™"; and the Interpress Electronic Printing Standard, Version 3.0, Xerox System Integration Standard XNSS 048601 (January 1986). Also, the much earlier Xerox Corporation "9700 Electronic printing System"; the "VP Local Laser Printing" software application package, which, together with the Xerox "4045" or other Laser Copier/Printer, the "6085" "Professional Computer System" using Xerox Corporation "ViewPoint" or "GlobalView®" software and a "local printer [print service] Option" kit, comprises the "Documenter" system. The even earlier Xerox Corporation "8000" "Xerox Network Services Product Descriptions" further describe other earlier Xerox Corporation electronic document printing systems. Eastman Kodak "LionHeart™" systems, first announced Sep. 13, 1990, are also noted. Popular commercial published "systems software" including LAN workstation connections includes Novell® DOS 7.0, "Windows™" NT 3.1, and IBM OS/2 Version 2.1, and upgrades thereof.

A specific feature of the specific embodiment(s) disclosed herein is to provide a reproduction method for printing reproductions of a black and white only original document on a digital printer capable of color printing with selected black and white text portions of said original document being printed in a highlight color in said reproductions, wherein said black and white only original document uses at least two different fonts, the improvement forming an electronic image of said black and white only original document; selecting at least one said font used in said black and white only original document; automatically electronically searching said electronic image of said black and white only original document to find and electronically designate occurrences of said same selected font to be reproduced in a highlight color by electronically providing a color printing control associated therewith; and printing said electronic image of said black and white only original document with said digital printer automatically controlled by said color printing control so that said occurrences of said selected font are printed in said highlight color, by automatically replacing said original text in said selected font with said highlight color, and with said other black and white text in said other font printed in black and white, to provide reproductions with automatic color highlighting of only said selected font, without requiring manual designations of coordinate locations therefor.

Further specific features provided by the system disclosed herein, individually or in combination, include those wherein said black and white only original document comprises a preexisting physical hardcopy document, and said forming of an electronic image thereof includes scanning said original document on an electronic image scanner to provide an electronic document scan, and transferring said electronic document scan to a user interface terminal programmed with image processing software to form said electronic image of said black and white only original document; and/or wherein said selected font is a text font automatically highlight color printed wherever it occurs in said original document; and/or wherein a preprinting step includes variable operator pre-programming of software to recognize one or more special fonts which may be used in a black and white document, and, upon said recognition in said electronic black and white document image, to automatically generate color printing instructions associated with those recognized fonts so that those fonts will print in color on said color printer; and/or wherein said selected font comprises large area letters, and said method provides automatic identification and color printing of the interior of said large area letters; and/or further including the additional step of adding additional text in a selected font to said electronic image of said black and white only original document and electronically providing a said color printing control associated therewith.

It is well known and preferable to program and execute imaging and printing control functions and logic with conventional software instructions for conventional microprocessors. This is taught by the above and other patents and commercial products. Such software may of course vary depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts.

In the description herein the term "sheet" refers to a usually flimsy sheet of paper, plastic, or other such conventional individual image substrate. The "copy sheet" may be abbreviated as the "copy". A "job" is a set of related sheets, usually a collated copy set copied from a set of original document sheets or electronic page images from a particular user or otherwise related.

As to specific hardware components of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Figure 2:
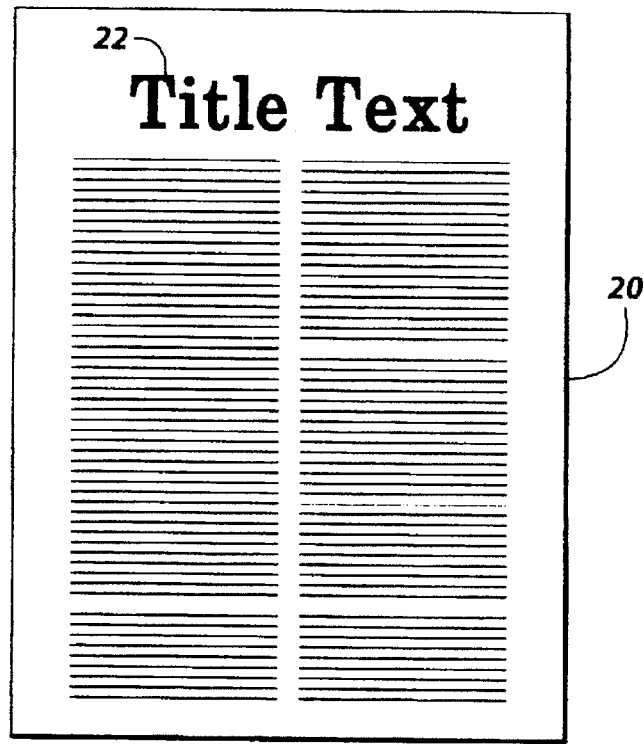
Figure 3:
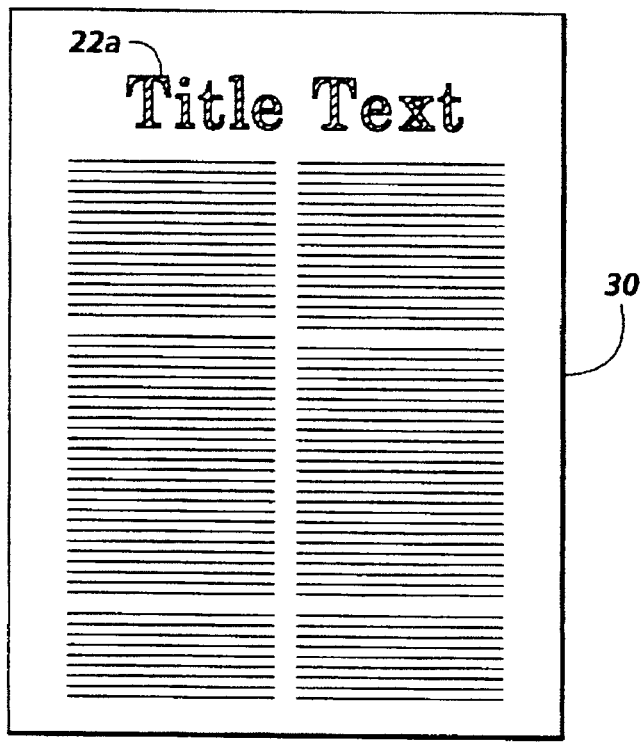

FIG. 1 schematically illustrates one example of the present system with a conventional networked set of a black and white document scanner, PC operator terminal loaded with PDL image processing software, network server, and highlight color printer;

FIG. 2 shows one example of a black and white original document sheet to be scanned in the scanner of FIG. 1; and FIG. 3 shows a printed copy sheet of the black and white original document of FIG. 2, with a selected font thereof shown printed in a highlight color by the system of FIG. 1.

Referring to the Figures, in FIG. 1, there is shown, merely by way of examples with which the present system 10 may be used with, or incorporated into, a document processing network 11, in which are illustrated here a physical document scanner 12, operator terminal with keyboard (user interface) 14, server 16 and highlight (or full) color printer 18. It will be appreciated that typical system networks may include choices of several such or different electronically accessable components. Although digital network systems are typically in some sort of electronic communications or connection, it will be appreciated that the present system may also be used with electronic documents transferred between equipment by floppy or hard disks, or other manually transported media.

The disclosed system is particularly useful for documents generated by scanning in, on an optical scanner, existing hardcopy (physical sheet or book) documents, such as the original document sheet 20 of FIG. 2, which are entirely black and white printed, including the text portion thereof in the illustrated exemplary special font 22. There are vast quantities of documents existing only as such hardcopy black and white (B&W) only documents. This system can reproduce those B&W documents with highlight coloring of a selected font, such as 22 here. That is shown in FIG. 3, where the document 20 copy 30 has all of the font 22 areas thereof reproduced as color-printed fonts 22a.

As is otherwise conventional and need not be described, the document to be reproduced may be fed to or placed on the scanner 12 platen and scanned. The raw electronic bitmap image thereof is then electronically processed before printing. Typically, that includes operator image corrections or changes with image processing software, and PDL conversions, using the display terminal 14, and/or the printing controller or other suitable preprinting system. Note the above-described prior art.

In converting a scanned image to a PDL description, typically the conversion simply frames the bitmap and produces a command such as "print the following bitmap". For controlling the process from the PDL description, one can use an OCR processor and font recognizer before the PDL description. OCR is commonly done by software in a standard Microsoft "Windows" compatible PC computer with software such as "Textbridge" from Xerox Imaging Systems, Inc. With a page defined, a PDL composer can generate an appropriate description.

Here, the operator may then also additionally select certain fonts to be printed in color. This may be done by variably operator pre-programming (and storing) programmable software controls to recognize one or more particular fonts used in the black and white document, using any of the herein cited known, or other, font recognition software techniques. The operator may either enter the font description directly, if known, or, more likely, select with a mouse or other cursor device a text string, segment or part of a displayed specific single font text on the terminal 14 display screen (user interface), which particular font text is part of the displayed imaged of the scanned-in document. These will often be special print, large area, fonts, as typically used in titles, subtitles, etc., since that is often the part of documents operators wish to highlight and stand out from the rest of the document text. However, the present system is not limited thereto. E.g., special notes or warning messages buried in the text but in a different, even smaller, font may be highlight printed, if desired.

Thereafter, until deselected or changed by the operator to different fonts, upon such recognition, the software will automatically generate color printing instructions associated with those recognized fonts, so that they will automatically print in color (on a color printer) separately from the rest of the document. That is, the selected fonts, and only the selected fonts, may be printed in color, to stand out, while the rest of the document, that is, all of it printed in other fonts, may still be printed in its original black and white. This may be provided with color printing software conventional for various printers with color printing capability. E.g., using a color font description or a "Postscript II" or other color object description such as "print this object red". Commercially available PDL software products enable an electronic document to have a "font call" in electronic code electronically identifying a particular text to be printed in a particular font.

This may be easily done even by a casual operator. It does not require carefully manually defining, on precisely located x and y axes, each and every area of the document to be highlight colored, as in many present highlight color reproduction systems. Any part of the document having that same selected font, either orginally, or typed in by the operator, can be automatically printed in color. Every occurrence of that font throughout the entire document, wherever it appears, even if widely separated by other font text, may be automatically color printed without seeking out and marking or indicating the text areas manually. Alternatively, only one or more continuous text strings of the subject font can be selected to be colored. Graphics may be compatably highlight color encoded also, by a similarly printer-recognizable non-printing control character entered by the operator when entering the graphics to be highlight colored into the electronic document.

It will also be appreciated that electronic documents electronically prepared in black and white only PDLs not having color descriptive capability may also be selective font color printed. In that case, the B&W PDL font descriptor(s) of the fonts desired to be highlight color printed can be programmed in to be recognized and a color print descriptor added to that font descriptor, in the user interface terminal, server, printer controller, or other image processor in the network. That may include freshly typed text to be merged into scanned-in hardcopy documents as well as separate non-hardcopy originals. As noted, commercially available PDL software products provide a "font call" in electronic code electronically identifying a particular text to be printed in a particular font. This font call can be additionally provided with a color selection here.

As another feature, the system herein may be utilized to non-print, rather than color, the identified font (or substitute another text label, such as "deleted for security reasons"). This can be used for security purposes, such automatically deleting from selected copies, for designated recipients, certain selected titles, notes, addressee lists, or other text portions, if they were typed or printed in distinct fonts.

There is considerable art, including widespread commercially available software, for PCs and other workstations, on optical character recognition (OCR). Any suitable OCR may be utilized herein to recognize a particular font desired to be automaticaly colored in printing that document. However, it is also noted that font pattern recognition can be used instead for that function. E.g., a scanned document electronic image can be checked for a particular bittmapped "tile" that matches a pre-programmed stored pattern, since fonts to be printed are normally at some point in bitmap form with a particular point size or font size fitted within a particular boundary box or "tile". Thus, the font recognition can be from the particular tile or pattern the particular font resides in. Note that it is only necessary for this system here to be able to tell that a font is different from other scannned or transmitted fonts used in that document. It is not necessary to actually identify the particular font. There are more than 40 different fonts of various point sizes in common English text use.

Another, alternative, form of image font recognition is that described in a commonly assigned 1994 U.S. patent application, App. Ser. No. 08/369,440 filed Jan. 6, 1995 attorney docket No. D/94097 by Zhigang Fan, et al, on font attribute extraction by statistical analysis. Recognizable font attributes include x-height, ascender height (distance between ascender and baseline), stroke thickness, slant, serifness, and character width.

While the embodiment disclosed herein is preferred, it will be appreciated from this teaching that various alternatives, modifications, variations or improvements therein may be made by those skilled in the art, which are intended to be encompassed by the following claims:

What is claimed is:

1. In a reproduction method for printing reproductions of a black and white only original document on a digital printer capable of color printing with selected black and white text portions of said original document being printed in a highlight color in said reproductions, wherein said black and white only original document uses at least two different black and white text fonts, the improvement comprising:

forming an electronic image of said black and white only original document;

selecting at least one special black and white font used in said black and white only original document;

automatically electronically searching said electronic image of said black and white only original document to find and electronically designate occurrences of said same selected special font to be reproduced in a highlight color by electronically providing a color printing control associated therewith;

printing said electronic image of said black and white only original document with said digital printer automatically controlled by said color printing control so that said occurrences of said selected special black and white font are printed in said highlight color, by automatically replacing said black and white in said selected special font with said highlight color, with text in said other font printed in black and white, to provide reproductions with automatic color highlighting of only said selected special font, without requiring manual designations of coordinate locations therefor;

wherein said black and white only original document comprises a preexisting physical hardcopy document, and said forming of an electronic image thereof includes scanning said original document on an electronic image scanner to provide an electronic document scan, and transferring said electronic document scan to a user interface terminal programmed with image processing software to form said electronic image of said black and white only original document;

wherein a preprinting step includes variable operator pre-programming of software to recognize said special font in said black and white document, and, upon said recognition of said special font in said black and white document, to automatically generate color printing instructions associated with said recognized special font so that said special font will print in color on said color printer; and wherein said scanned special font being automatically identified to be reproduced in a highlight color is automatically identified by being identified as substantially larger area font letters in comparison to the font in which other portions of said document is printed, which special font is found to be occurring near the beginning of said document.

2. The reproduction method of claim 1, wherein said method provides automatic identification and color printing of the interior of said larger area font letters.

3. The reproduction method of claim 1 wherein a further said scanned black and white text font is recognized to be automatically deleted, so as to non-print.

4. The reproduction method of claim 1 wherein a further said scanned black and white text font is recognized and automatically deleted, so as to non-print, and is replaced with a substituted text label so indicating.

* * * * *